USO09205906B1

United States Patent
Eichinger

(10) Patent No.: US 9,205,906 B1
(45) Date of Patent: *Dec. 8, 2015

(54) MOUNTS, MOUNTING ARRANGEMENTS, AND METHODS OF MAKING MOUNTING ARRANGEMENTS FOR SUPPORTING OUTBOARD MOTORS WITH RESPECT TO MARINE VESSELS

(71) Applicant: Brunswick Corporation, Lake Forest, IL (US)

(72) Inventor: Charles H. Eichinger, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,369

(22) Filed: Jul. 14, 2014

Related U.S. Application Data

(63) Continuation of application No. 13/688,109, filed on Nov. 28, 2012, now Pat. No. 8,820,701.

(51) Int. Cl.
*F16M 1/00* (2006.01)
*B63H 20/06* (2006.01)
*B63H 20/02* (2006.01)

(52) U.S. Cl.
CPC ............... *B63H 20/06* (2013.01); *B63H 20/02* (2013.01)

(58) Field of Classification Search
CPC ........ B63H 20/08; B63H 20/02; B63H 21/30; B63H 21/305
USPC ....................... 248/640; 267/141.4
See application file for complete search history.

(56) References Cited

U.S. PATENT DOCUMENTS

| 3,606,218 | A | | 9/1971 | Enlund et al. | |
|---|---|---|---|---|---|
| 3,934,537 | A | * | 1/1976 | Hall | 440/52 |
| 4,805,868 | A | | 2/1989 | Claude | |
| 4,995,598 | A | | 2/1991 | Ingham | |
| 5,118,087 | A | | 6/1992 | Jordens et al. | |
| 5,192,039 | A | | 3/1993 | Williams | |
| 5,192,235 | A | * | 3/1993 | Dunham et al. | 440/52 |
| 5,657,510 | A | | 8/1997 | Satori et al. | |
| 5,702,094 | A | | 12/1997 | McLelland et al. | |
| 6,341,991 | B1 | | 1/2002 | Ogino | |
| 6,419,534 | B1 | | 7/2002 | Helsel et al. | |
| 6,645,019 | B1 | * | 11/2003 | Shiomi et al. | 440/52 |

(Continued)

*Primary Examiner* — Kristina Junge
(74) *Attorney, Agent, or Firm* — Andrus Intellectual Property Law, LLP

(57) ABSTRACT

A mounting arrangement is for supporting an outboard motor with respect to a marine vessel extending in a fore-aft plane. The mounting arrangement comprises first and second mounts that each have an outer shell, an inner wedge concentrically disposed in the outer shell, and an elastomeric spacer between the outer shell and the inner wedge. Each of the first and second mounts extend along a axial direction, along a vertical direction that is perpendicular to the axial direction, and along a horizontal direction that is perpendicular to the axial direction and perpendicular to the vertical direction. The inner wedges of the first and second mounts both have a non-circular shape when viewed in a cross-section taken perpendicular to the axial direction. The non-circular shape comprises a first outer surface that extends transversely at an angle to the horizontal and vertical directions. The non-circular shape comprises a second outer surface that extends transversely at a different, second angle to the horizontal and vertical directions. A method is for making the mounting arrangement.

38 Claims, 7 Drawing Sheets

(56) References Cited

U.S. PATENT DOCUMENTS

| | | |
|---|---|---|
| 6,666,437 B2 | 12/2003 | Larmande et al. |
| 7,063,310 B2 | 6/2006 | Power et al. |
| 7,168,452 B2 | 1/2007 | Sasaki et al. |
| 7,172,476 B2 | 2/2007 | Nakamura et al. |
| 7,198,530 B1 | 4/2007 | Rothe et al. |
| 7,207,527 B2 | 4/2007 | Opperthauser |
| 7,219,882 B2 | 5/2007 | Kato |
| 7,520,475 B2 | 4/2009 | Opperthauser |
| 7,574,971 B2 | 8/2009 | Butts et al. |
| 7,637,472 B2 | 12/2009 | Endo |
| 7,644,911 B2 | 1/2010 | Rodecker |
| 7,735,812 B2 | 6/2010 | Fitzgerald |
| 7,883,061 B2 | 2/2011 | Miyata et al. |
| 7,896,304 B1 | 3/2011 | Eichinger et al. |
| 8,038,132 B2 | 10/2011 | Thornhill et al. |
| 8,066,266 B2 | 11/2011 | Rodecker |
| 2002/0108662 A1 | 8/2002 | Opperthauser |
| 2003/0042089 A1 | 3/2003 | Tamura et al. |
| 2005/0194728 A1 | 9/2005 | Molet et al. |
| 2007/0045918 A1 | 3/2007 | Thornhill et al. |
| 2011/0065340 A1 | 3/2011 | Klawitter et al. |

\* cited by examiner

MOUNTS, MOUNTING ARRANGEMENTS, AND METHODS OF MAKING MOUNTING ARRANGEMENTS FOR SUPPORTING OUTBOARD MOTORS WITH RESPECT TO MARINE VESSELS

CROSS REFERENCE TO RELATED APPLICATION

This application is a continuation of U.S. patent application Ser. No. 13/688,109, filed Nov. 28, 2012, which is incorporated herein by reference in entirety.

FIELD

The present disclosure relates to mounts, mounting arrangements, and methods of making mounting arrangements for supporting outboard motors with respect to marine vessels.

BACKGROUND

U.S. Pat. No. 7,896,304, which is incorporated herein by reference in entirety, discloses a support system for an outboard motor. The support system has mounts which are configured and positioned to result in an elastic center point being located closely to a roll axis of the outboard motor which is generally vertical and extends through a center of gravity of the outboard motor. The mounts are positioned so that lines which are perpendicular to their respective center lines intersect at an angle which can be generally equal to 90 degrees. The mounts are positioned in non-interfering relationship with the exhaust components of the outboard motor and its oil sump.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure arose during continuing research and development of mounts, mounting arrangements and methods of making mounting arrangements for supporting outboard motors with respect to marine vessels.

In some examples, mounts for supporting an outboard motor with respect to a marine vessel comprise an outer shell, an inner wedge disposed in the outer shell, and an elastomeric spacer between the outer shell and the inner wedge. The mount axially extends between first and second ends in an axial direction and radially extends between and inside and an outside in a vertical direction that is perpendicular to the axial direction and in a horizontal direction that is perpendicular to the axial direction and perpendicular to the vertical direction. The inner wedge has a non-circular shape when viewed in a cross-section taken perpendicular to the axial direction. The non-circular shape comprises a first outer surface that extends transversely at a first angle to the horizontal and vertical directions. The non-circular shape comprises a second outer surface that extends transversely at a different, second angle to the horizontal and vertical directions.

In other examples, mounting arrangements are for supporting an outboard motor with respect to a marine vessel having a center axis. The mounting arrangement comprises first and second mounts that both have an outer shell, an inner wedge disposed in the outer shell, and an elastomeric spacer between the outer shell and the inner wedge. The first and second mounts each respectively axially extend between first and second ends in an axial direction, and radially extend in a vertical direction that is perpendicular to the axial direction and in a horizontal direction that is perpendicular to the axial direction and perpendicular to the vertical direction. The inner wedges of the first and second mounts both have a non-circular shape when viewed in a cross-section taken perpendicular to the respective axial direction. The non-circular shape comprises a first outer surface that extends transversely at a first angle to the respective horizontal and vertical directions. The non-circular shape comprises a second outer surface that extends transversely at a different, second angle to the horizontal and vertical directions.

In other examples, methods are of making a mounting arrangement for supporting an outboard motor with respect to a marine vessel having a center axis. The methods can comprise making first and second mounts that each have an outer shell, an inner wedge disposed in the outer shell, and an elastomeric spacer between the outer shell and the inner wedge. The first and second mounts each respectively axially extend between first and second ends in an axial direction, and radially extend in a vertical direction that is perpendicular to the axial direction and in a horizontal direction that is perpendicular to the axial direction and perpendicular to the vertical direction. The inner wedges of the first and second mounts have a non-circular shape when viewed in a cross-section taken perpendicular to the axial direction. The non-circular shape comprises first and second outer surface that both extend at angles that are transverse to the horizontal and vertical directions. The first and second mounts are both set at an angle with respect to a center axis of the marine vessel such that the first ends of the mounts are closer to the marine vessel and closer to the center axis of the marine vessel than the second ends of the mounts. A ratio of shear force versus compression force that is desired to act upon the elastomeric spacer during radial displacement of the mount is identified. The inner wedges of the first and second mounts are made so that the angles at which the first and second outer surfaces extend with respect to the horizontal and vertical directions cause the desired ratio of shear versus compression force during the radial displacement of the mount.

BRIEF DESCRIPTION OF THE DRAWINGS

Examples of mounts, mounting arrangements, and methods of making mounting arrangements for supporting outboard motors with respect to marine vessels are described with reference to the following figures. The same numbers are used throughout the figures to reference like features and components.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

This disclosure arose during the present inventor's research and development of mount systems having upper mounts with a relatively low fore-aft spring rate designed to attenuate fore-aft shaking force from an outboard motor. The inventor has realized that available design space for such mounts is limited by the surrounding engine and its mounting components. The inventor has also realized a continuing need to minimize size and weight of marine propulsion components, while maintaining effectiveness and durability of such components. Therefore the inventor has endeavored to provide focalized and/or semi-focalized mounting arrangements for supporting outboard motors and their associated fore-aft shaking forces while still retaining advantages of the existing designs design regarding for example packaging, isolation, durability, service, oil drain-back, and/or cost. The mounting arrangements disclosed herein thus provide mounts and associated arrangements and methods that are adaptable to a very wide range of radial and axial stiffness rates in a compact package.

Figure 1:
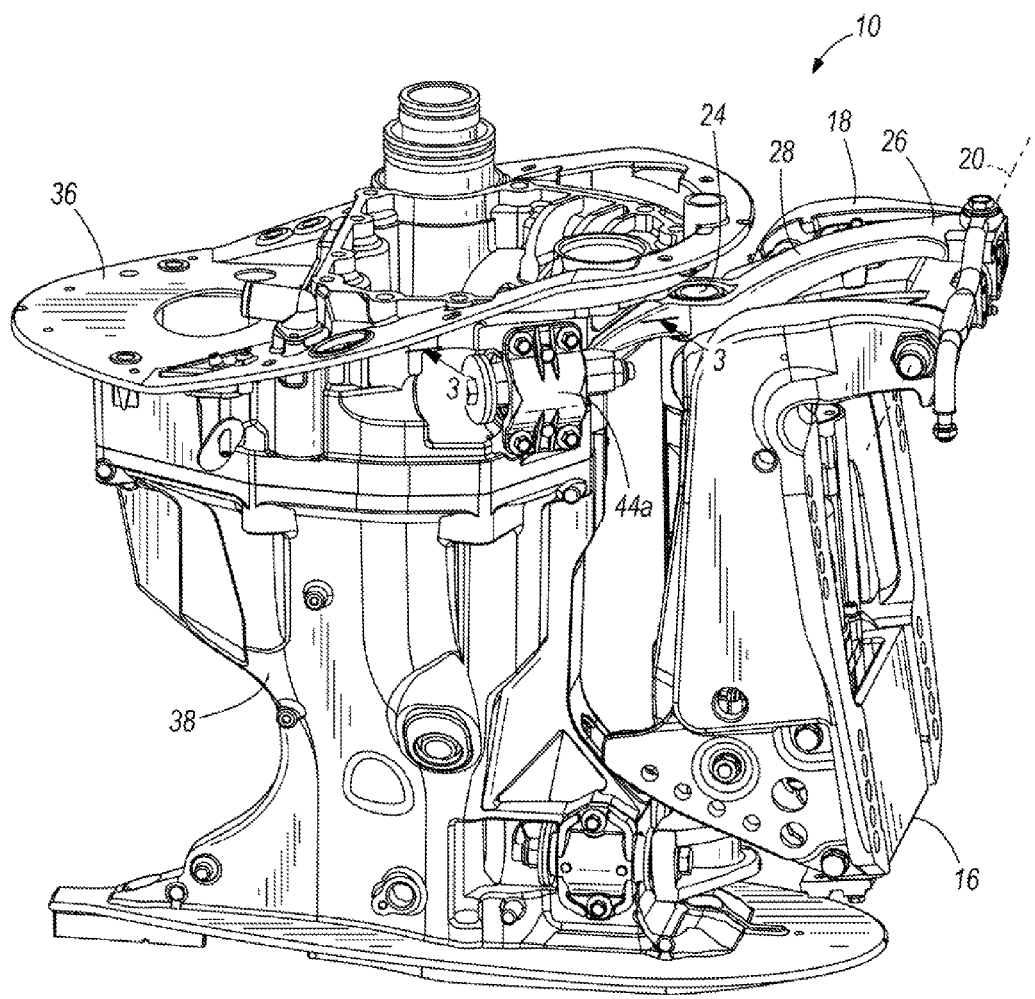
FIG. 1 is a perspective view of a mounting arrangement for supporting an outboard motor with respect to a marine vessel.
Figure 2:
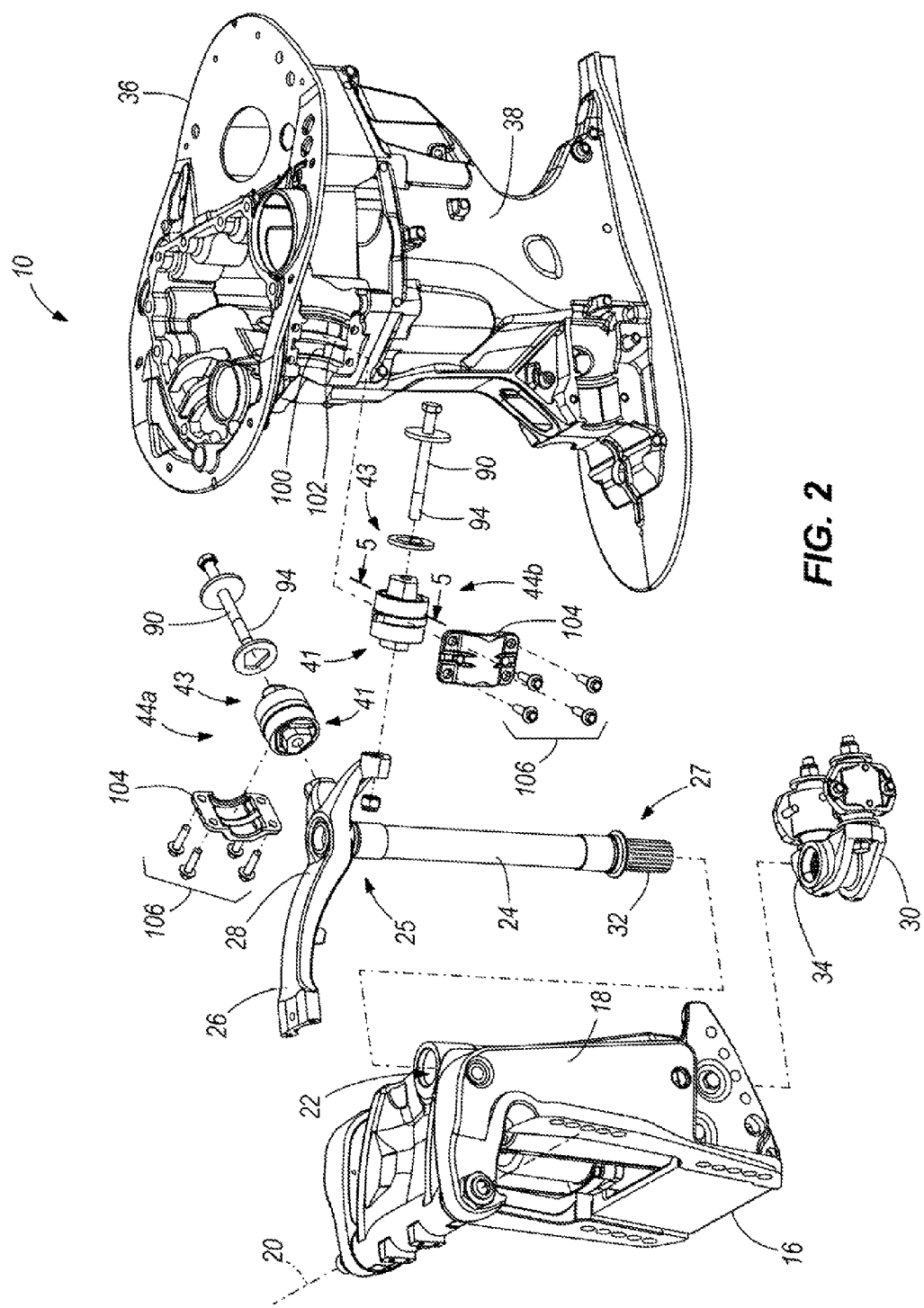
FIG. 2 is an exploded view of the mounting arrangement of FIG. 1.
Figure 6:
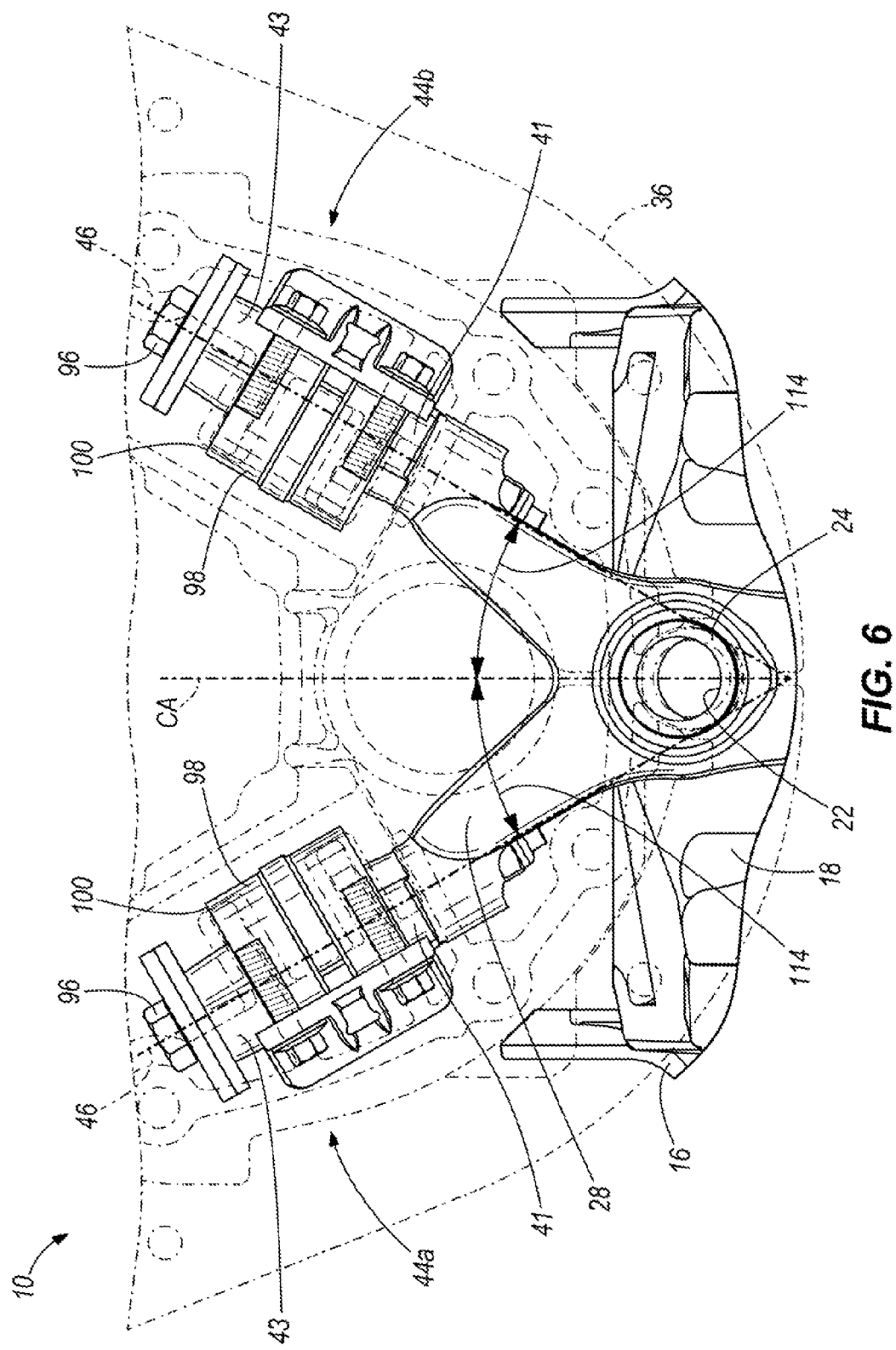
FIG. 6 is a top view partially showing the mounting arrangement of FIG. 1.

FIGS. 1, 2 and 6 depict a mounting arrangement 10 for supporting an outboard motor with respect to a marine vessel. The exact configuration of the mounting arrangement 10 can vary from that which is shown in the drawings and described herein. For example the mounting arrangement 10 can be configured for use with a wide variety of outboard motors and marine vessels. In the example shown, the mounting arrangement 10 includes a transom bracket 16 that is configured for attachment to a transom of the marine vessel. A swivel bracket 18 is pivotally attached to the transom bracket 16 in a conventional manner and is configured for rotation about a generally horizontal tilt/trim axis 20. The swivel bracket 18 is provided with a tubular opening 22, which is shaped to receive a tubular steering member 24. The tubular steering member 24 has an upper end 25 that is connected to an upper attachment bracket 28 having a steering arm 26. The tubular steering member 24 has a lower end 27 that is connected to a lower attachment bracket 30. During assembly, the tubular steering member 24 can be rigidly and permanently attached to the upper attachment bracket 28. Then the tubular steering member 24 is inserted in the tubular opening 22 formed in the swivel bracket 18. With the lower end of the tubular steering member 24 extending downwardly through the tubular opening 22, the lower attachment bracket 30 is connected to the lower end of the tubular steering member 24. The lower portion of the tubular steering member 24 has splined teeth 32 which are movable into threaded engagement with splined teeth 34 formed on an inner portion of the lower attachment bracket 30.

The upper attachment bracket 28 is connected to an adapter plate 36 on the outboard motor. The adapter plate 36 is connected to and supports a driveshaft housing 38 and other components (not shown) of the outboard motor in a conventional manner. The upper attachment bracket 28 is connected to the adapter plate 36 via first and second mounts 44a, 44b. The configuration and construction of each mount 44a, 44b can be the same and therefore the description that follows herein below regarding mount 44a equally applies to mount 44b, and vice versa.

Figure 4:
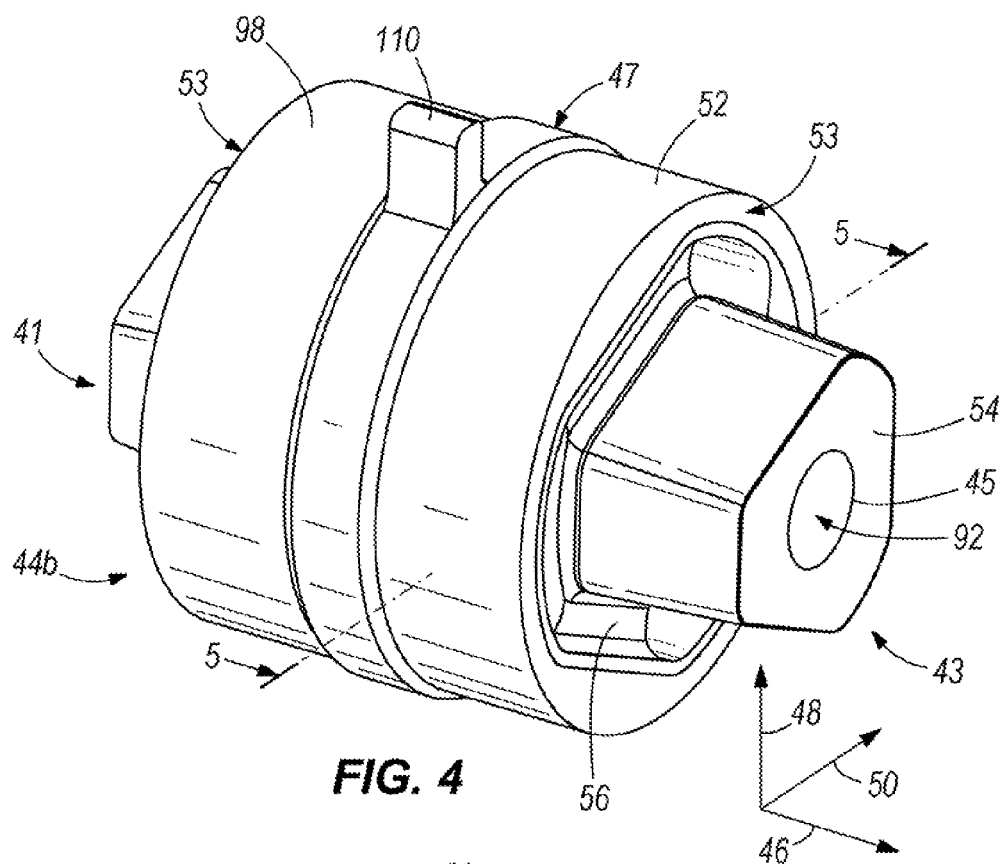
FIG. 4 is a perspective view of a mount for supporting an outboard motor with respect to a marine vessel.
Figure 5:
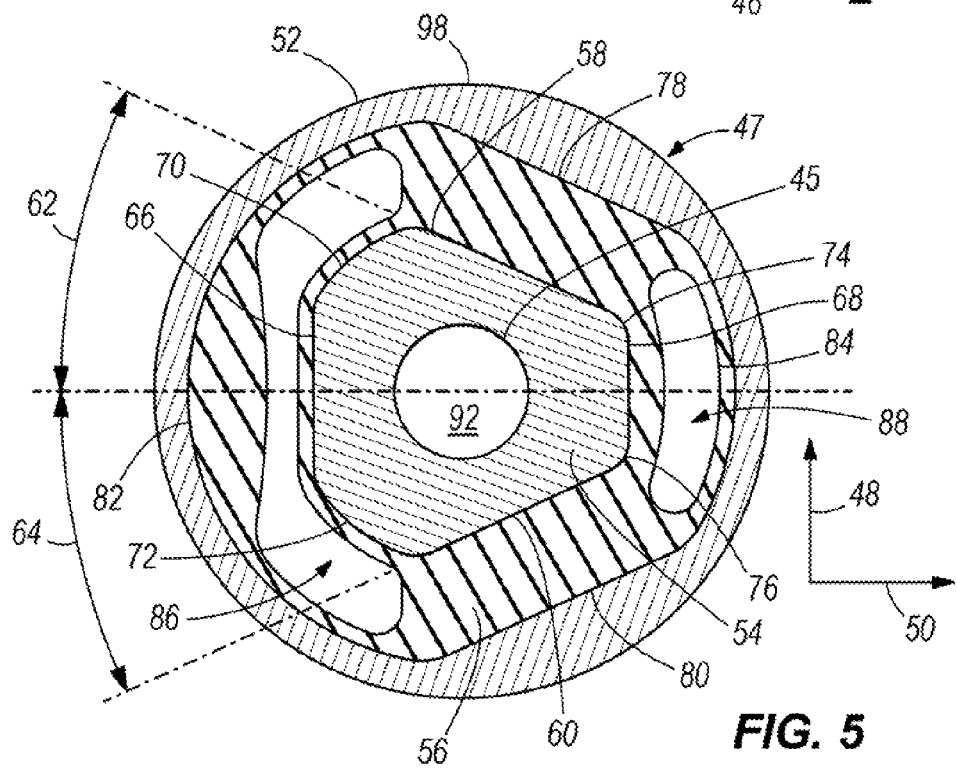
FIG. 5 is a view of Section 5-5 taken in FIGS. 2, 4 and 8.

Referring to FIGS. 4 and 5, mount 44b axially extends between a first end 41 and a second end 43 in an axial direction 46. Mount 44b radially extends between an inside 45 and an outside 47 in a vertical direction 48 that is perpendicular to the axial direction 46, and in horizontal direction 50 that is perpendicular to the axial direction 46 and perpendicular to the vertical direction 48. Mount 44b has an outer shell 52, an inner wedge 54 that is disposed in the outer shell 52, and an elastomeric spacer 56 that is between the outer shell 52 and inner wedge 54. The inner wedge 54 extends axially outwardly of the outer shell 52 at the first and second ends 41, 43. Outer end faces 53 of outer shell 52 are provided at the first and second ends 41, 43. The particular shape and configuration of the outer shell 52, inner wedge 54 and elastomeric spacer 56 can vary within the concepts discussed in the present disclosure. The outer shell 52 and inner wedge 54 can be made of metal. The elastomeric spacer 56 can be made of rubber or other suitable elastomeric material.

Figure 7:
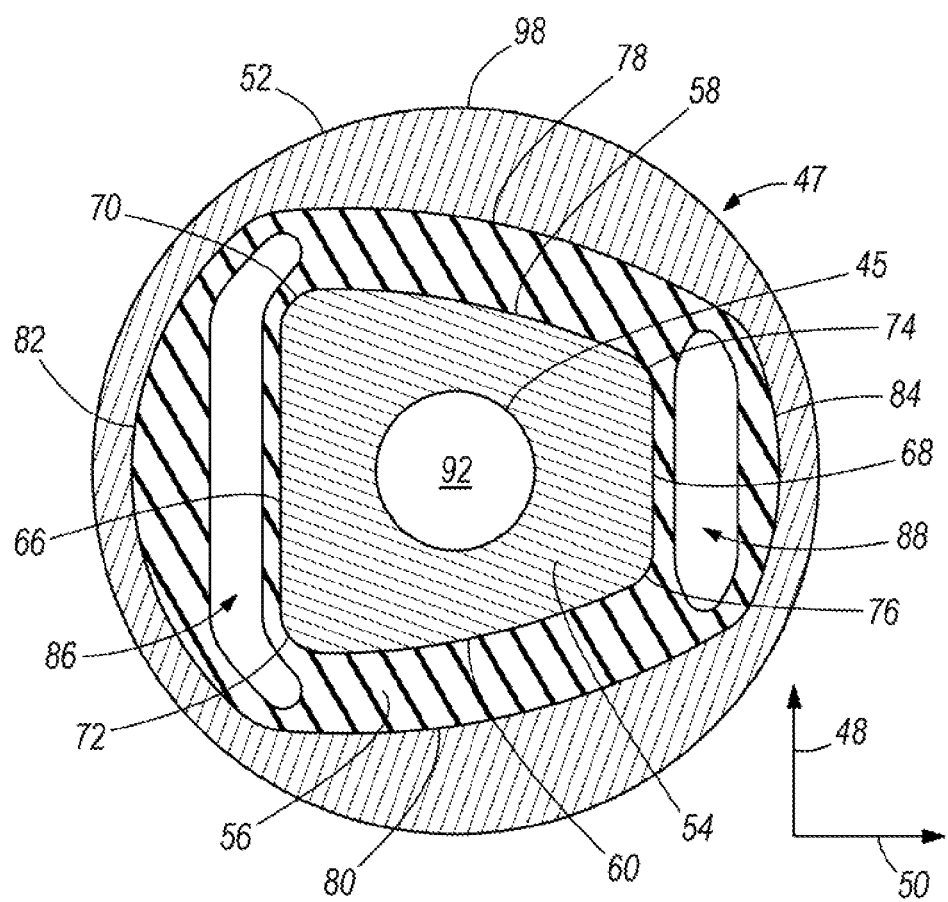
FIG. 7 is a view of Section 5-5 taken in FIG. 4, showing an alternate embodiment.

Referring to FIG. 5, the inner wedge 54 has a non-circular, asymmetrical shape with respect to the horizontal direction 50 when viewed in a cross-section (5-5) taken perpendicular to the axial direction 46. In this example, the non-circular shape includes first and second outer surfaces 58, 60 that extend transversely at different respective angles 62, 64 with respect to the vertical direction 48 and horizontal direction 50. In this example, the first and second outer surfaces 58, 60 are not parallel to each other, but rather extend at opposite angles 62, 64, respectively, to the vertical and horizontal directions 48, 50. The particular angles 62, 64 can both vary from that which is shown and described, as will be discussed further herein below. In one example, the outer surfaces 58, 60 extend at respective transverse angles that are in a range of 5 degrees to 30 degrees from the noted horizontal direction 50. In another example, the outer surfaces 58, 60 extend at respective transverse angles that are in a range of 8 degrees to 25 degrees from the noted horizontal direction. In yet another example, the outer surfaces 58, 60 extend at respective transverse angles that are in a range of 10 degrees to 20 degrees from the noted horizontal direction. The various ranges of angles discussed herein above are not limiting on the disclosure and it should be understood that for any given outboard motor design there will likely be one or more particular angles that best meet design criteria. In the example shown in FIG. 5, the outer surfaces 58, 60 are straight linear surfaces when viewed in the cross-section 5-5; however, it is not necessary that the outer surfaces 58, 60 be linear surfaces when viewed in cross-section. For example the outer surfaces 58, 60 can be curvilinear surfaces when viewed in the cross-section 5-5, such as in the example shown in FIG. 7.

Referring to FIG. 5, the non-circular shape of the inner wedge 54 also has third and fourth opposing outer surfaces 66, 68 that extend perpendicularly to the horizontal direction 50. The non-circular shape also has curved transition surfaces 70, 72 that connect the respective outer surfaces 58, 60 to the outer surface 66. The non-circular shape also has curved edges 74, 76 connecting the respective outer surfaces 58, 60 to the outer surface 68. The outer shell 52 has first and second opposing inner surfaces 78, 80 that extend parallel to the respective outer surfaces 58, 60 of the inner wedge 54, respectively. Opposing inner surfaces 78, 80 can be straight linear surfaces (FIG. 5) or curvilinear surfaces (FIG. 6). The outer shell 52 also has third and fourth opposing inner surfaces 82, 84 that join the noted opposing inner surfaces 78, 80. In this example, the opposing inner surfaces 82, 84 are curvilinear when viewed along cross-section 5-5.

The elastomeric spacer 56 has a pair of apertures 86, 88. The number, configuration and location of the apertures 86, 88 can vary from that which is shown. In this example, the aperture 86 is located on the opposite side of the inner wedge 54 with respect to the aperture 88, when viewed in cross-section perpendicular to the noted axial direction 46.

The outer shell 52 of the mount 44a has a cylindrical outer surface 98. At least one alignment tab 110 extends radially outwardly from the outer surface 98 of the outer shell 52.

Figure 3:
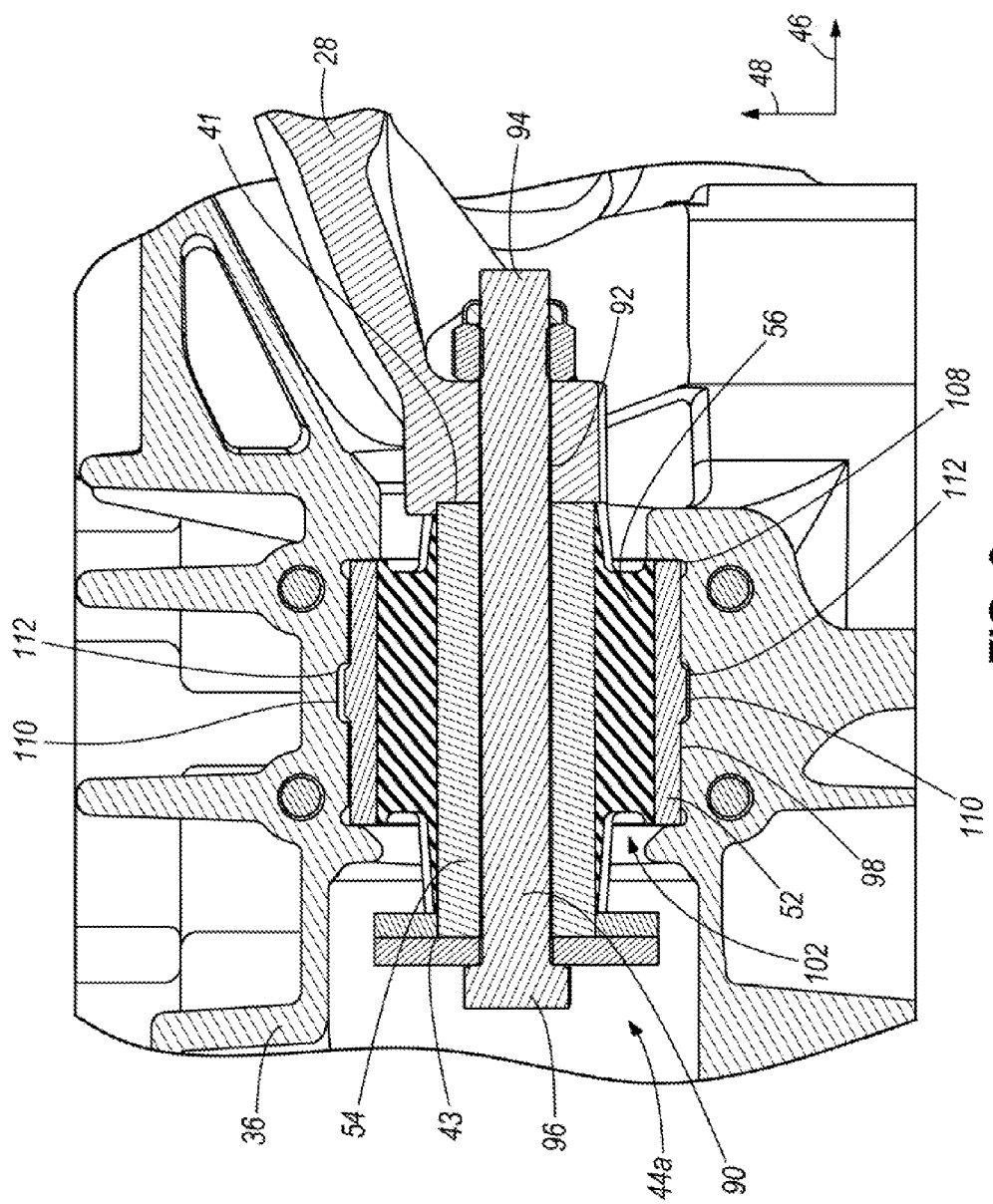
FIG. 3 is a view of Section 3-3 taken in FIG. 1.

As shown in FIG. 3, elongated connector 90 extends through an inner borehole 92 in the mounts (FIG. 3 shows only one elongated connector 90 and mount 44a). The elongated connector 90 has a first end 94 that is connected in a threaded connection to the upper attachment bracket 28 and a second end 96 coupled to the adapter plate 36.

As shown in FIGS. 2, 3 and 6, the mounts 44a, 44b are disposed in respective pockets 100 formed by recesses 102 in the adapter plate 36 and covers 104 attached to the adapter plate 36 by connectors 106. Pockets 100 have a cylindrical inner surface 108 that is sized slightly larger than the mounts 44a, 44b so as to abut with the outer surface 98 and outer end faces 53 of the outer shell 52 and retain the mounts 44a, 44b with respect to the adapter plate 36, and thus with respect to the outboard motor and marine vessel. The outer surface 98 of the outer shell 52 closely fits with the inner surface 108 of the pocket 100 such that axial and radial forces from the internal combustion engine (not shown) of the outboard motor act on the adapter plate 36 and also on the mounts 44a, 44b. The alignment tab 110 extending radially outwardly from the cylindrical outer surface 98 engages in an alignment recess 112 in the inner surface 108 to align and retain the mount 44a from rotation within the pocket 100.

As shown in FIG. 6, the first and second mounts 44a, 44b are set at an angle 114 with respect to the center axis CA of the marine vessel such that the first ends 41 of the mounts 44a, 44b are closer to the marine vessel and closer to the center axis CA of the marine vessel than the second ends 43 of the mounts 44a, 44b. The first and second mounts 44a, 44b are set with respect to the center axis CA of the marine vessel such that the outer surface 68 of the inner wedge 54 is transverse to and closer to the center axis CA than the outer surface 66. In this example, the location and position of the first mount 44a mirrors the location and position of the second mount 44b so that the mounts equally receive and attenuate fore-aft shaking forces.

Figure 8:
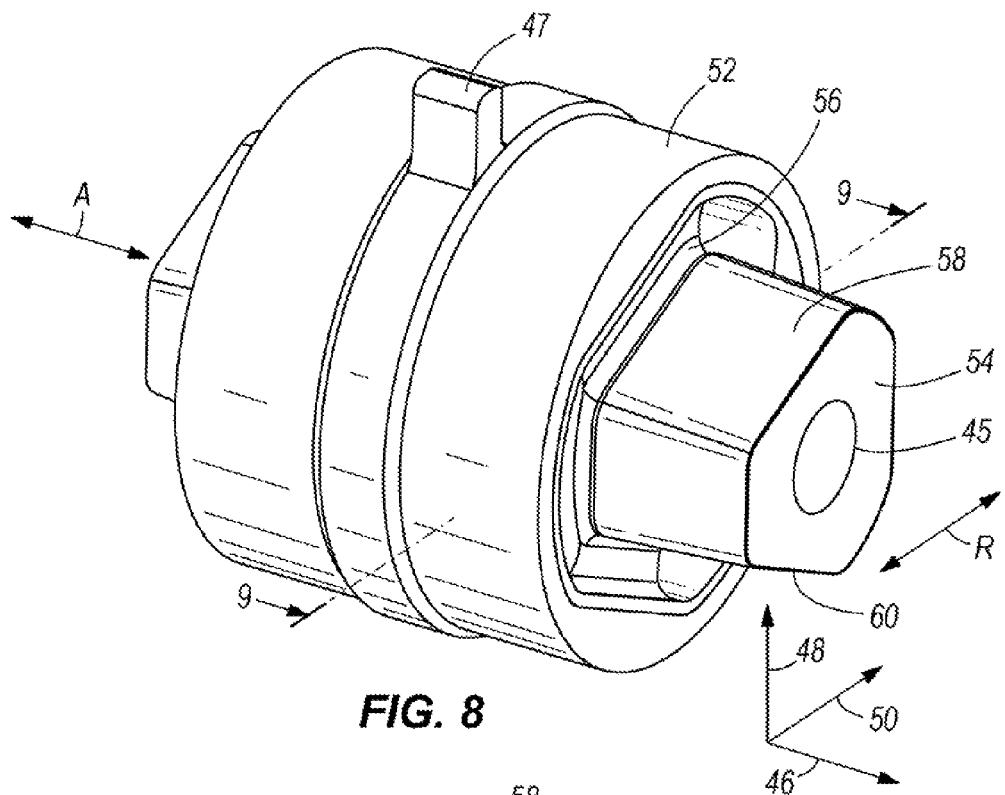
FIG. 8 is like FIG. 4, showing axial and radial motion of a mount.
Figure 9:
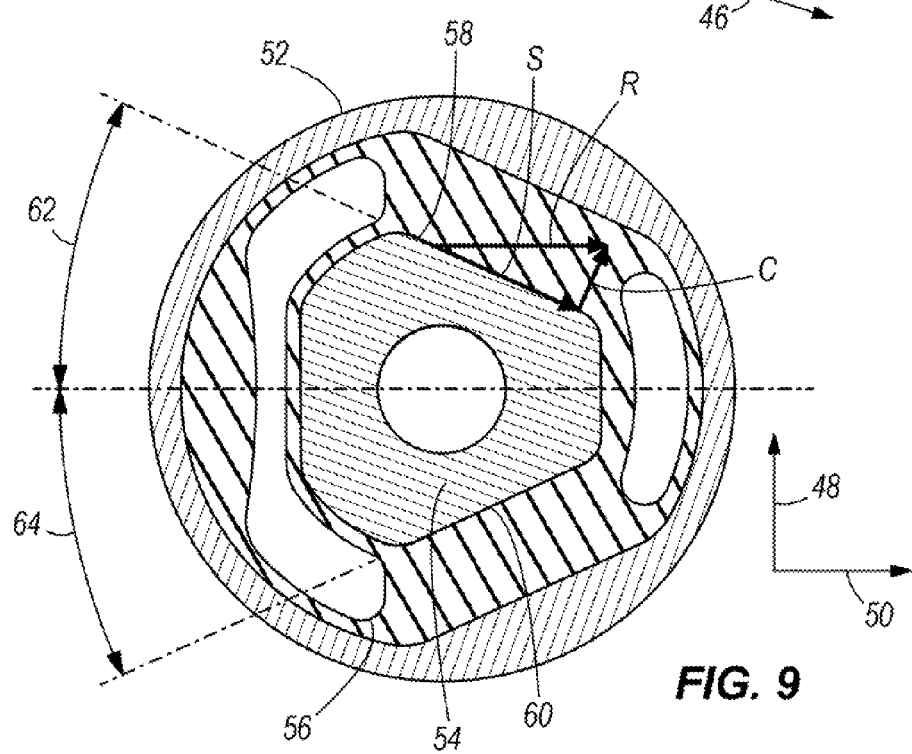
FIG. 9 is like FIG. 5, showing compression and shear displacements on the mount.

During operation of the outboard motor that is supported by the mounts 44a, 44b, fore-aft shaking forces of the outboard motor act on the mounts 44a, 44b in the form of both shear and compression. In the example shown, the mounts 44a, 44b are uniquely configured to attenuate both the noted fore-aft shaking forces and rotational forces within the design constraints described herein above, such as for example packaging, isolation, durability, service, oil drain-back, and/or cost. As shown in FIGS. 8 and 9, each mount 44a, 44b is subjected to axial motion A and radial motion R caused by the noted fore-aft shaking forces and rotational forces of the outboard motor. During axial motion, the elastomeric spacer 56 is entirely subjected to shear forces. During radial motion, the elastomeric spacer 56 is subjected to a combination of compression force C and shear force S, the ratio of which depends upon the angle 62, 64 of the outer surfaces 58, 60 with respect to the noted horizontal direction 50. The present inventors have found it is possible to configure the non-circular inner wedge 54, and particularly the angles 62, 64, so as to achieve a necessary ratio of shear and compression force on the elastomeric spacer 56 in a more compact mount design. Thus the configuration of the present disclosure provides a mount that can be sized smaller than a conventional mount having a circular cross-section, while still achieving the performance results including with respect to fore-aft spring rate and location of elastic center.

Thus, the present disclosure provides a method of making a mounting arrangement 10 for supporting an outboard motor with respect to a marine vessel. The method includes the steps of making the noted first and second mounts 44a, 44b, which each have the outer shell 52, inner wedge 54 disposed in the outer shell 52, and elastomeric spacer 56 between the outer shell 52 and inner wedge 54. A ratio of shear force S versus compression force C that is desired to act upon the elastomeric spacer 56 during radial displacement of the respective mount 44a, 44b can be identified. It is then possible to make the inner wedges 54 of the first and second mounts 44a, 44b so that the angles 62, 64 at which the first and second outer surfaces 58, 60 extend with respect to the horizontal and vertical directions 48, 50 cause the desired ratio of shear force S versus compression force C (S/C) during radial displacement of the mount 44a, 44b.

What is claimed is:

1. A mount for supporting an outboard motor with respect to a marine vessel, the mount comprising:
   an outer shell, an inner wedge disposed in the outer shell, and an elastomeric spacer between the outer shell and the inner wedge;
   wherein the mount axially extends between first and second ends in an axial direction;
   wherein the mount radially extends between an inside and an outside in a vertical direction that is perpendicular to the axial direction and in a horizontal direction that is perpendicular to the axial direction and perpendicular to the vertical direction;
   wherein the inner wedge has an asymmetrical shape with respect to the vertical direction when viewed in a cross-section taken perpendicular to the axial direction; and
   wherein the asymmetrical shape comprises a first outer surface that extends transversely at an angle to the horizontal and vertical directions; and a second outer surface that extends transversely at a different, second angle to the horizontal and vertical directions;
   an inner borehole that extends through the inner wedge in the axial direction; and
   an elongated connector that extends through the inner borehole.

2. The mount according to claim 1, wherein the first and second outer surfaces are not parallel to each other.

3. The mount according to claim 2, wherein the first and second outer surfaces extend oppositely from each other with respect to the vertical and horizontal directions.

4. The mount according to claim 3, wherein the first outer surface extends at an angle from horizontal that is in a range of 5 degrees to 30 degrees.

5. The mount according to claim 1, wherein the first and second outer surfaces are straight linear surfaces when viewed in a cross-section taken in the axial direction.

6. The mount according to claim 1, wherein the first and second outer surfaces are curvilinear surfaces when viewed in a cross-section taken in the axial direction.

7. The mount according to claim 1, wherein the asymmetrical shape comprises third and fourth outer surfaces that are opposing and that extend perpendicularly to horizontal.

8. The mount according to claim 7, wherein the asymmetrical shape comprises at least one curved transition surface connecting at least one of the first and second outer surfaces to one of the third and fourth outer surfaces.

9. The mount according to claim 1, wherein the outer shell comprises first and second opposing inner surfaces that extend parallel to the first and second outer surfaces of the inner wedge, respectively.

10. The mount according to claim 9, wherein the outer shell comprises third and fourth opposing inner surfaces that both connect the first and second outer surfaces when viewed in a cross-section taken in the axial direction.

11. The mount according to claim 10, wherein the third and fourth opposing inner surfaces are curvilinear surfaces when viewed in a cross-section taken in the axial direction.

12. The mount according to claim 1, wherein the elastomeric spacer defines at least one aperture there through.

13. The mount according to claim 12, wherein the at least one aperture is one of a plurality of apertures located on opposite sides of the inner wedge when viewed in the cross section taken in the longitudinal direction.

14. The mount according to claim 1, wherein the outer shell has a cylindrical outer surface.

15. The mount according to claim 1, comprising an alignment tab extending radially outwardly from an outer surface of the outer shell.

16. A mounting arrangement for supporting an outboard motor with respect to a marine vessel, the mounting arrangement comprising:
first and second mounts that both have an outer shell, an inner wedge disposed in the outer shell, and an elastomeric spacer between the outer shell and the inner wedge;
wherein the first and second mounts each respectively axially extend between first and second ends in an axial direction, and radially extend in a vertical direction that is perpendicular to the axial direction and in a horizontal direction that is perpendicular to the axial direction and perpendicular to the vertical direction;
wherein the inner wedges of the first and second mounts both have an asymmetrical shape with respect to the vertical direction when viewed in a cross-section taken perpendicular to the axial direction, wherein the asymmetrical shape comprises a first outer surface that extends transversely at an angle to the horizontal and vertical directions and a second outer surface that extends transversely at a different, second angle to the horizontal and vertical directions.

17. The mounting arrangement according to claim 16, wherein the first and second mounts are both set at an angle with respect to a center axis of the marine vessel such that the first ends of the mounts are closer to the marine vessel and closer to the center axis of the marine vessel than the second ends of the mounts.

18. The mounting arrangement according to claim 17, wherein the angle at which the first and second mounts are set with respect to the center axis is 30 degrees.

19. The mounting arrangement according to claim 16, wherein the first and second outer surfaces extend oppositely from each other with respect to the vertical and horizontal directions.

20. The mounting arrangement according to claim 19, wherein the first ends of the first and second connectors are connected to the outboard motor via an adapter plate and wherein the second ends of the first and second connectors are coupled to the marine vessel via a transom bracket.

21. The mounting arrangement according to claim 20, wherein the adapter plate comprises a pocket having an inner surface for retaining the mount with respect to the outboard motor.

22. The mounting arrangement according to claim 21, wherein the outer shell has an outer surface and wherein the pocket has an inner surface that abuts against the outer surface of the outer shell so as to retain the mount in the pocket.

23. The mounting arrangement according to claim 22, comprising an alignment tab extending radially outwardly from the outer surface of the outer shell and further comprising an alignment recess in the inner surface of the pocket for receiving the alignment tab.

24. The mounting arrangement according to claim 16, comprising a first elongated connectors extending through a borehole in the first mount, and comprising a second elongated connector extending through a borehole in the second mount, wherein both of the first and second elongated connectors have a first end coupled to the outboard motor and a second end coupled to the marine vessel.

25. The mounting arrangement according to claim 16, wherein the first and second outer surfaces are not parallel to each other.

26. The mounting arrangement according to claim 25, wherein the first and second outer surfaces extend oppositely from each other with respect to the vertical and horizontal directions.

27. The mounting arrangement according to claim 26, wherein the first outer surface extends at an angle from horizontal that is in a range of 5 degrees to 30 degrees.

28. The mounting arrangement according to claim 16, wherein the first and second outer surfaces are straight linear surfaces when viewed in a cross-section taken in the axial direction.

29. The mounting arrangement according to claim 16, wherein the first and second outer surfaces are curvilinear surfaces when viewed in a cross-section taken in the axial direction.

30. The mounting arrangement according to claim 16, wherein the asymmetrical shape comprises third and fourth outer surfaces that are opposing and that extend perpendicularly to horizontal.

31. The mounting arrangement according to claim 30, wherein the asymmetrical shape comprises at least one curved transition surface connecting at least one of the first and second outer surfaces to one of the third and fourth outer surfaces.

32. The mounting arrangement according to claim 16, wherein the outer shell comprises first and second opposing inner surfaces that extend parallel to the first and second outer surfaces of the inner wedge, respectively.

33. The mounting arrangement according to claim 32, wherein the outer shell comprises third and fourth opposing inner surfaces that both connect the first and second outer surfaces when viewed in a cross-section taken in the axial direction.

34. The mounting arrangement according to claim 33, wherein the third and fourth opposing inner surfaces are curvilinear surfaces when viewed in a cross-section taken in the axial direction.

35. The mounting arrangement according to claim 16, wherein the elastomeric spacer defines at least one aperture there through.

36. The mounting arrangement according to claim 35, wherein the at least one aperture is one of a plurality of apertures located on opposite sides of the inner wedge when viewed in the cross section taken in the longitudinal direction.

37. The mount according to claim 16, wherein the outer shell has a cylindrical outer surface.

38. The mount according to claim 16, comprising an alignment tab extending radially outwardly from an outer surface of the outer shell.

* * * * *